US008238582B2

(12) United States Patent
Brown et al.

(10) Patent No.: US 8,238,582 B2
(45) Date of Patent: Aug. 7, 2012

(54) SOUND PLAYBACK AND EDITING THROUGH PHYSICAL INTERACTION

(75) Inventors: Lorna Brown, Cambridge (GB); Abigail Durrant, London (GB); David Frohlich, Elstead (GB); Sian Lindley, Cambridge (GB); Gerard Oleksik, Bradwell (GB); Dominic Robson, London (GB); Francis Rumsey, Guildford (GB); Abigail Sellen, Cambridge (GB); John Williamson, Glasgow (GB)

(73) Assignee: Microsoft Corporation, Redmond, WA (US)

( * ) Notice: Subject to any disclaimer, the term of this patent is extended or adjusted under 35 U.S.C. 154(b) by 1040 days.

(21) Appl. No.: 11/952,820

(22) Filed: Dec. 7, 2007

(65) Prior Publication Data
US 2009/0147649 A1 Jun. 11, 2009

(51) Int. Cl.
*H04B 1/00* (2006.01)
(52) U.S. Cl. .................................. 381/119; 340/671
(58) Field of Classification Search ............... 381/119; 340/671
See application file for complete search history.

(56) References Cited

U.S. PATENT DOCUMENTS

| 5,307,051 A | | 4/1994 | Sedlmayr |
| 6,150,947 A | * | 11/2000 | Shima .......................... 340/692 |
| 6,418,346 B1 | | 7/2002 | Nelson et al. |
| 7,126,467 B2 | | 10/2006 | Albert et al. |
| 7,254,455 B2 | | 8/2007 | Moulios |
| 7,577,262 B2 | | 8/2009 | Kanamori et al. |
| 7,732,697 B1 | | 6/2010 | Wieder |
| 2002/0067835 A1 | | 6/2002 | Vatter |
| 2002/0111539 A1 | | 8/2002 | Cosentino et al. |
| 2003/0109298 A1 | * | 6/2003 | Oishi et al. ....................... 463/8 |
| 2003/0160682 A1 | | 8/2003 | Yamada et al. |
| 2003/0187924 A1 | | 10/2003 | Riddle |
| 2004/0001079 A1 | | 1/2004 | Zhao et al. |
| 2004/0153510 A1 | | 8/2004 | Riddle |
| 2006/0075347 A1 | | 4/2006 | Rehm |
| 2007/0013539 A1 | * | 1/2007 | Choi et al. ..................... 340/671 |
| 2007/0133351 A1 | | 6/2007 | Taylor |
| 2007/0172114 A1 | | 7/2007 | Baker et al. |
| 2009/0146803 A1 | | 6/2009 | Sellen et al. |
| 2009/0147649 A1 | | 6/2009 | Brown et al. |
| 2009/0183074 A1 | | 7/2009 | Lindley et al. |

FOREIGN PATENT DOCUMENTS

| EP | 0298046 | 1/1989 |
| EP | 1755242 A2 | 2/2007 |

OTHER PUBLICATIONS

Bian, et al., "Using Sound Source Localization to Monitor and Infer Activities in the Home", pp. 1-16.
Laydrus, et al., "Automated Sound Analysis System for Home Telemonitoring Using Shifted Delta Cepstral Features", IEEE, 2007, pp. 135-138.
"Sonic Interventions", at <<http://www.dwrc,surrey.ac.uk/ResearchProjects/CurrentProjects/SonicInterventions/tabid/105/Default.aspx>>, University of Surrey, Oct. 18, 2007, pp. 1.
Virone, et al., "First Steps in Data Fusion between a Multichannel Audio Acquisition and an Information System for Home Healthcare", IEEE, 2003, pp. 1364-1367.
Office Action for U.S. Appl. No. 11/972,283, mailed on Dec. 20, 2011, David Frohlich, "Communication Devices", 8 pgs.
Final Office Action for U.S. Appl. No. 11/972,326, mailed on May 25, 2011, Sian Lindley, "Sound Display Devices", 11 pages.

* cited by examiner

*Primary Examiner* — Douglas Menz
(74) *Attorney, Agent, or Firm* — Lee & Hayes, PLLC

(57) ABSTRACT

The disclosure relates to sound playback and editing apparatus. The editing apparatus uses user interaction to allow the user to instinctively modify recorded sound. This can be achieved by converting a quality of the user's physical interactions with the editing apparatus into instructions for processing the sound. For example, in one embodiment the user can mix sound files by 'mixing', i.e. shaking, physical representations of those sound files (such as the recording medium on which the files are stored) alone or together.

18 Claims, 8 Drawing Sheets

SOUND PLAYBACK AND EDITING THROUGH PHYSICAL INTERACTION

BACKGROUND

Sound editing is generally a complex process carried out by professional editors. Although in recent years sound editing software packages have become available for the home user, these require a high level of understanding of both the software package and of sound editing. In other, simpler, examples of sound editing, digital dictation devices may allow a user to add or insert a portion of audio to an existing recording. However, none of the present sound editing devices are particularly instinctive to a user.

Various sound recording and playback devices already in existence allow the easy capture of sound data. Such devices range from, for example, memo-recorders (often incorporated in pens or the like, capable of recording only a few seconds of sound) through tape recorders and digital dictation devices and up to sophisticated recording and editing suites used for professional sound recording. All such devices have their place, in particular sound recording devices which are portable and easy to operate.

SUMMARY

The following presents a simplified summary of the disclosure in order to provide a basic understanding to the reader. This summary is not an extensive overview of the disclosure and it does not identify key/critical elements of the invention or delineate the scope of the invention. Its sole purpose is to present some concepts disclosed herein in a simplified form as a prelude to the more detailed description that is presented later.

The disclosure relates to sound playback and editing apparatus. The editing apparatus uses user interaction to allow the user to instinctively modify recorded sound. This can be achieved by converting a quality of the user's physical interactions with the editing apparatus into instructions for processing the sound. For example, in one embodiment the user can mix sound files by 'mixing', i.e. shaking, physical representations of those sound files (such as the recording medium on which the files are stored) alone or together.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

Figure 1:
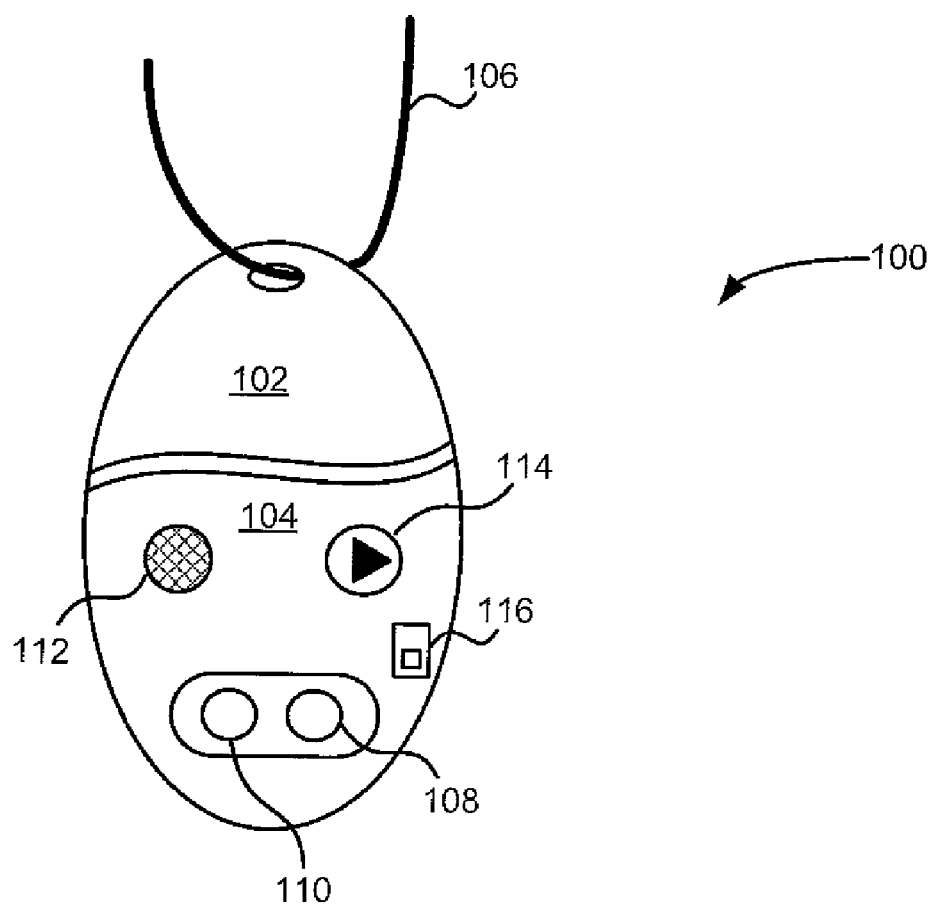
FIG. 1 is a schematic diagram of a portable apparatus for recording sound.

FIG. 1 is a portable recording apparatus 100. In this exemplary embodiment, the recording apparatus 100 comprises a holder 102 in the form of a cap arranged to retain a recording unit 104 in a friction fit. The holder 102 is mounted on a string 106 such that the recording device 100 can be worn about the neck of a user.

The recording unit 104 is ergonomically shaped such that it can be held comfortably by a user, in this example comprising a rounded pebble shape. The unit 104 comprises two user input buttons: a retrospective record button 108 and a prospective record button 110. The unit 104 also comprises a microphone/speaker 112, a playback button 114 and store/edit switch 116.

Figure 2:
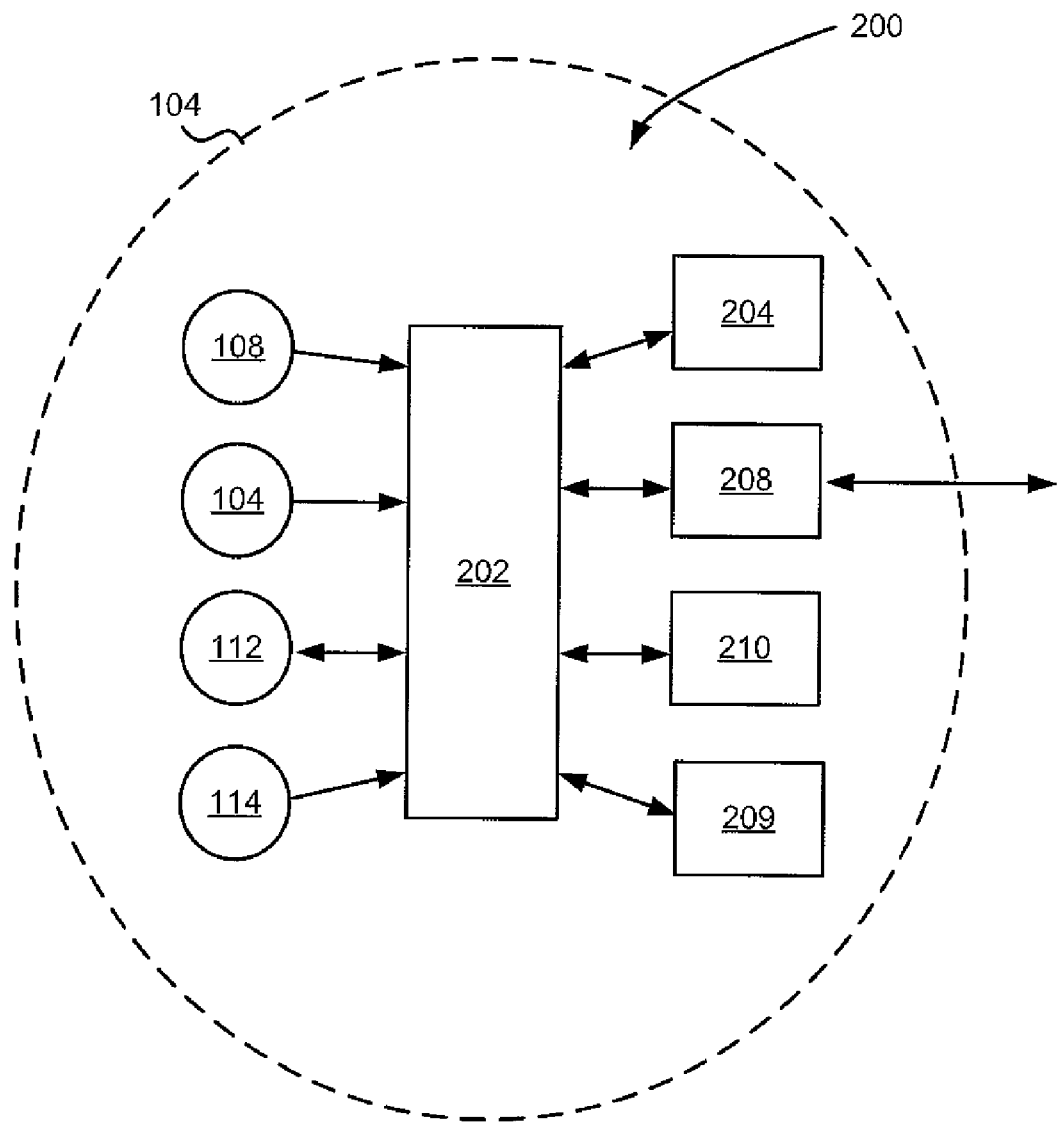
FIG. 2 is a schematic representation of a portion of the apparatus of FIG. 1.

FIG. 2 schematically shows the hardware and processing circuitry 200 arranged within the recording unit 104. In addition to the buttons 110, 108, 114, the switch 116 and the microphone/speaker 112, the unit 104 comprises a microprocessor 202 which is arranged to receive inputs from the buttons 110, 108, 114 and the switch 116 and further arranged to send and receive audio content to and from the microphone/speaker 112. The unit 104 also comprises a memory 204, arranged to store audio content (and therefore the unit 104 comprises a storage medium), a transmitter/receiver device 208 capable of transmitting and receiving audio data, a motion detector 209 which includes an accelerometer, and a battery 210.

In use of the unit 104, and in the absence of any other input, the microphone/speaker 112 receives ambient sound such as background noise, a conversation or sound deliberately supplied there to. The microprocessor 202 is arranged to store the previous minute of sound in the memory 204, continually recording over (or otherwise deleting) sound received before the previous minute.

Although a time of one minute has been specified here, the skilled person will appreciate that any different predetermined time period may be used.

A user may interact with the unit 104 by pressing the buttons 110, 108, 114. If the user presses the retrospective record button 104, the minute of sound currently held by the memory 204 is archived as a sound file, i.e. it will be protected from being deleted or recorded over. Alternatively, the user could press the prospective sound record button 110. This results in the unit 104 recording and archiving sound until the prospective sound record button 110 is pressed again.

An archived sound recording can be deleted by pressing both the prospective 110 and retrospective 108 sound record buttons simultaneously. This results in the unit 104 returning to the 'continuous record' operation as described above. An archived sound recording can be played via the microphone/speaker 112 by pressing the playback button 114.

If desired, a user can remove the unit 104 from the holder 102. This halts the 'continuous record' operation and enables the unit 104 and any sound recorded thereon to be stored for future play back of the sound. The behavior of the unit 104 thereafter depends on the position of the store/edit switch 116. If the switch 116 is in its 'store' position, then any sound file stored thereon will be held in the memory 204 (although editing of the sound file(s) may still be carried out by other apparatus). If however the switch 116 is in the edit position then the unit 104 is in an edit mode and a sound file stored thereon may be edited as described below.

Figure 3:
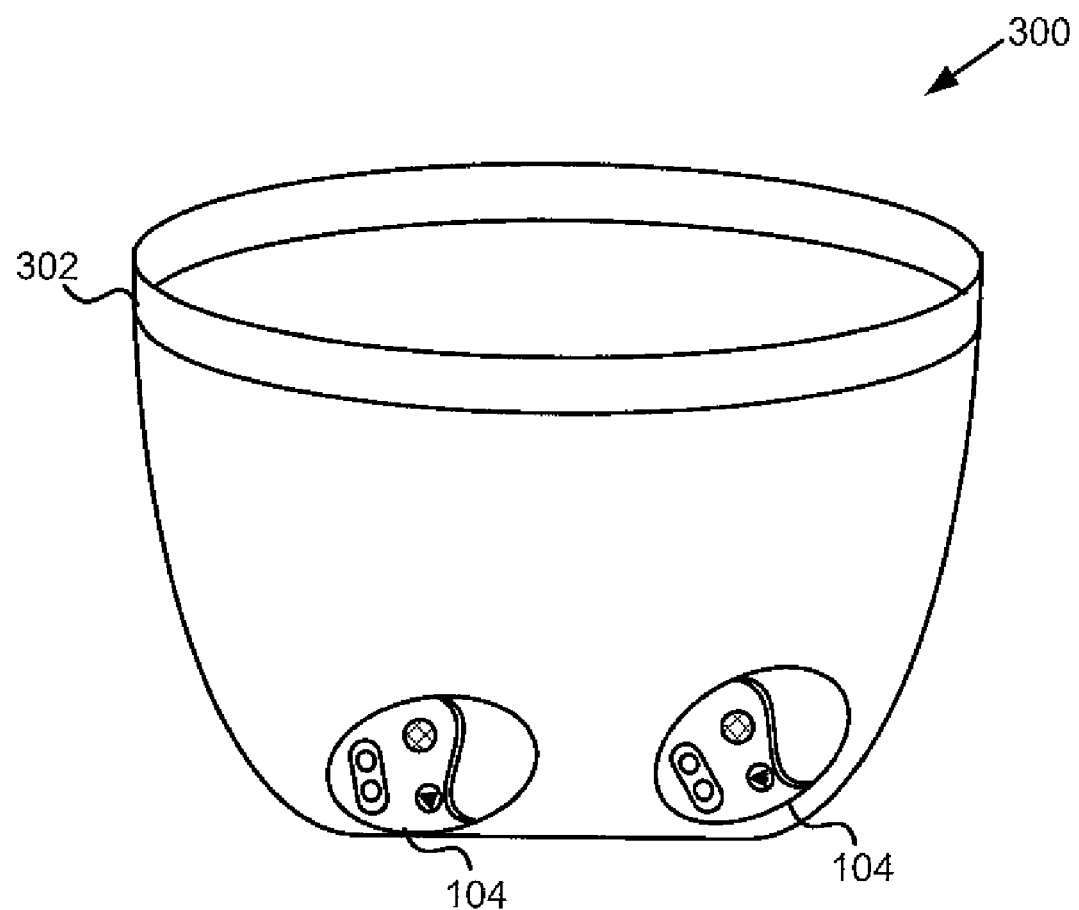
FIG. 3 is a schematic diagram of the playback device for use with the apparatus of FIG. 1.

In one embodiment, the unit 104 may be stored with other units 104 in a bowl 300, as illustrated in FIG. 3. The rim 302 of the bowl 300 comprises an identifying means, such as an RFID tag. When the unit 104 is moved past the rim 302 of the bowl, the transmitter/receiver 208 is arranged to detect that the unit 104 has passed the rim 302 by detecting the RFID tag. This is interpreted by the microprocessor 202 such that the microprocessor causes the recorded sound stored in the memory 204 to be played back. If the store/edit switch 116 is in the 'store' position, then there will be no further editing. If however the switch 116 is in the edit position, then editing processes will be carried out as described below.

Methods for editing the recorded sound are now described.

Figure 4:
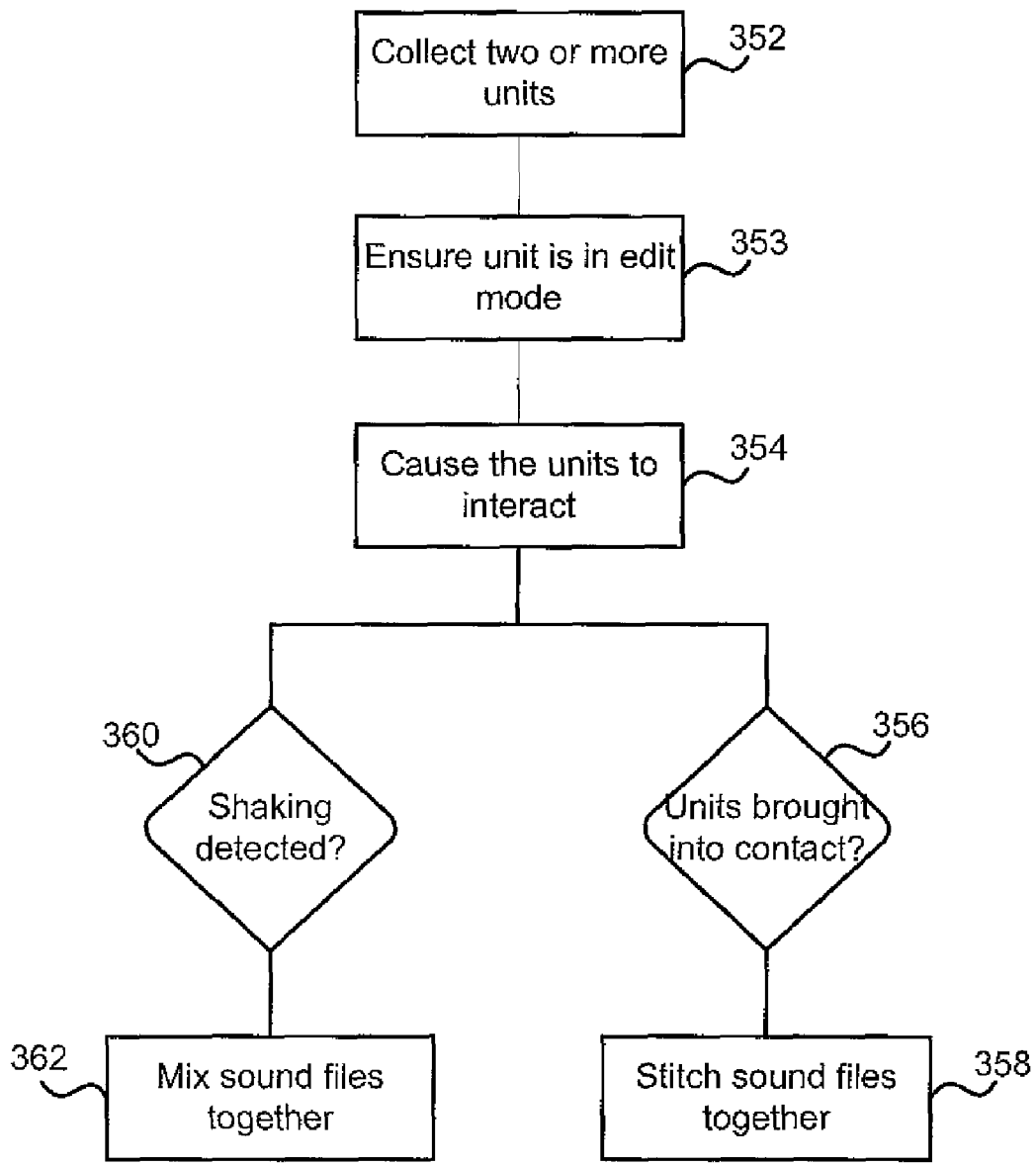
FIG. 4 shows a method for editing sound using the device of FIG. 1.

In a first method, described with reference to the flowchart of FIG. 4, the microprocessors 202 of two or more units 104 which have been removed from their holders 102 are arranged to interact with one another to mix or join the sound recordings stored in the memory 204 of each unit 104. In such embodiments, the units 104 themselves are arranged to act as sound editing apparatus.

First, two or more units are collected (block 352). The unit 104 is arranged such that the act of removing each unit 104 from its holder 102 allows the microprocessor to receive inputs from the motion detector 209. Further, removing the holder 102 causes the microprocessor 202 to activate the transmitter/receiver 208, which periodically emits a signal. If the transmitter/receiver 208 of another unit 104 receives this signal, it will send a response. In this embodiment, the transmitter/receivers 208 have a short range of around 2 to 5 cm. Therefore, on receipt of a response signal, a unit 104 will 'know' that another unit 104 is in close proximity. The user must also place the store/edit switch 116 in its edit position if editing is to be carried out (block 353).

By allowing the units 104 which are in close proximity to physically interact in different ways (block 354), different audio editing effects can be achieved. For example, by 'clicking' two units 104 together (block 356) (which results in a characteristic deceleration which is detected by the motion detector 209), the sound file stored on one unit 104 is transmitted as a data signal via the transmitter/receiver 208 to the transmitter/receiver 208 of the second unit 104 (block 358). The microprocessor 202 of the second unit 104 then 'stitches' (i.e. joins the files together) the transmitted data onto the data representing the sound stored in its memory 204. The effect is such that if the playback button 114 on the second unit 104 is now pressed, the portions of audio will be played one after another.

Alternatively, the user could mix the sound on two or more units 104 by holding them in one or two cupped hands and shaking them together, or by shaking or mixing the units 104 in the bowl 300 (block 360). This 'shaking' action would result in a characteristic acceleration pattern which would be detected by the motion detector 209. Again this would cause the data representing the recorded sounds to be transmitted to a common unit 104 (block 362). On play back of one unit 104, the sounds would be played on top of one another. A listener would hear an electronic mix of the sounds. The sound file in the memory 204 of other unit 100 would, in this embodiment, be deleted.

A user could interact with a single unit 104 by turning it through the air. This results in a characteristic acceleration which is detected by the motion detector 209 and which is interpreted by the microprocessor 202 to control the volume of playback. In this example, the arrangement is such that a sharp clockwise twisting of a unit 104 held to face a user results in an increase in volume and an anticlockwise twisting results in a decrease in volume, i.e. the user will interact with the unit 104 as a whole in the same way that would be instinctive to the user from use of a volume knob on a radio or the like.

A user could also interact with a single unit 104 by shaking it. If a unit 104 is shaken and no other unit 104 is detected as being close by, then, in this embodiment, the microprocessor 202 is arranged to 'scramble' the content of the sound files by taking portions of the sound and re-ordering them, such that, on playback, the sound is heard out of the order in which it was recorded. The more a unit 104 is shaken, the more the portions are shuffled and the sound file re-divided. In other embodiments, the act of shaking the unit 104 may be mirrored by adding a reverberation effect instead of, or as well as, scrambling the sound file. A reverberation effect imitates an echo, i.e. a sound which is bouncing off walls, which mirrors the manner in which a solid object would bounce of the walls of a container in which it was shaken.

Figure 5:
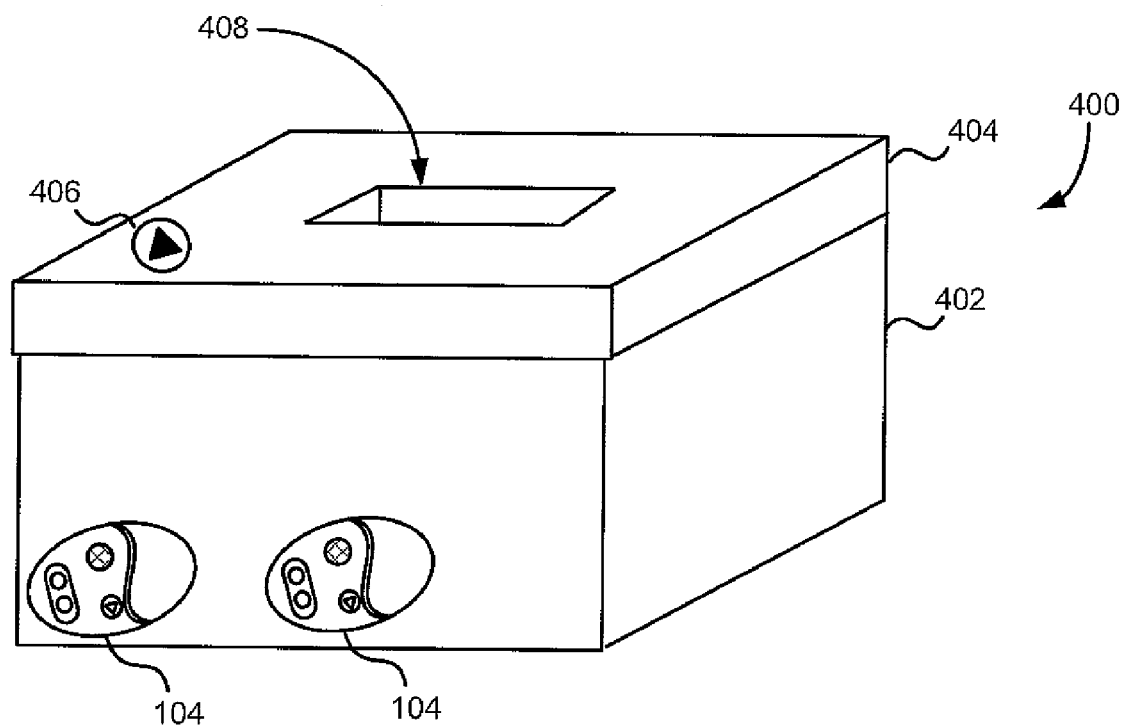
FIG. 5 is a schematic diagram of a sound mixer.

In an alternative embodiment, a separate sound mixer 400 may be employed as a sound editing apparatus such as is illustrated in FIG. 5.

As in the methods described above, the sound mixer 400 allows the user to edit the sound instinctively as the physical actions that are taken mirror the processing of the stored sound files. In this embodiment, the sound mixer 400 comprises a transparent plastic box 402 with a lid portion 404. The lid portion 404 houses a play button 406 and processing circuitry as is shown schematically in FIG. 6. There is a slot 408 in the lid portion 404 through which units 104 may be placed into the box 402.

Figure 6:
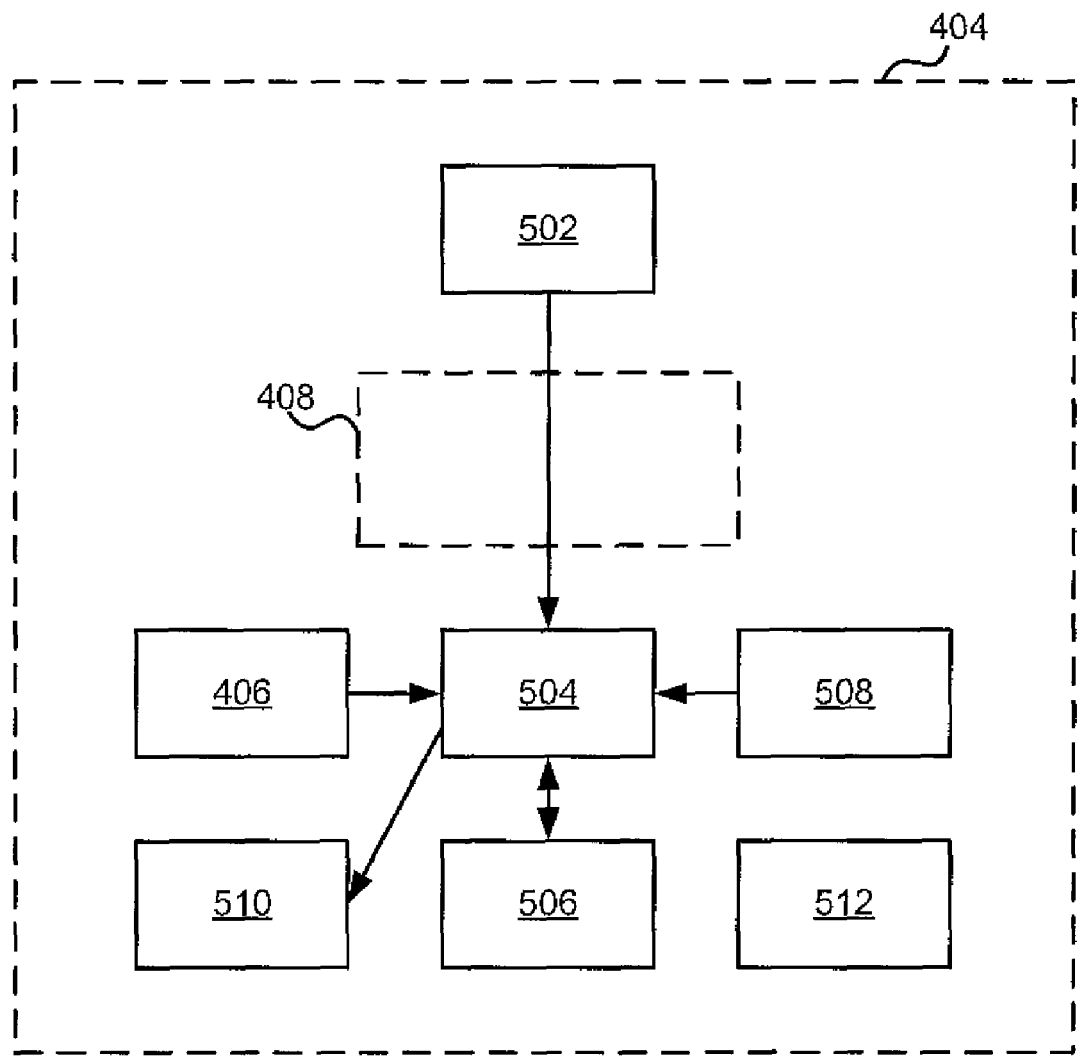
FIG. 6 is a schematic representation of a portion of the mixer of FIG. 4.

As is shown schematically in FIG. 6 the lid portion 404 houses an electronic signal receiver module 502, capable of receiving a data signal from a unit 104, a microprocessor 504, a memory 506, a motion detector 508, a speaker 510, and a battery 512.

Figure 7:
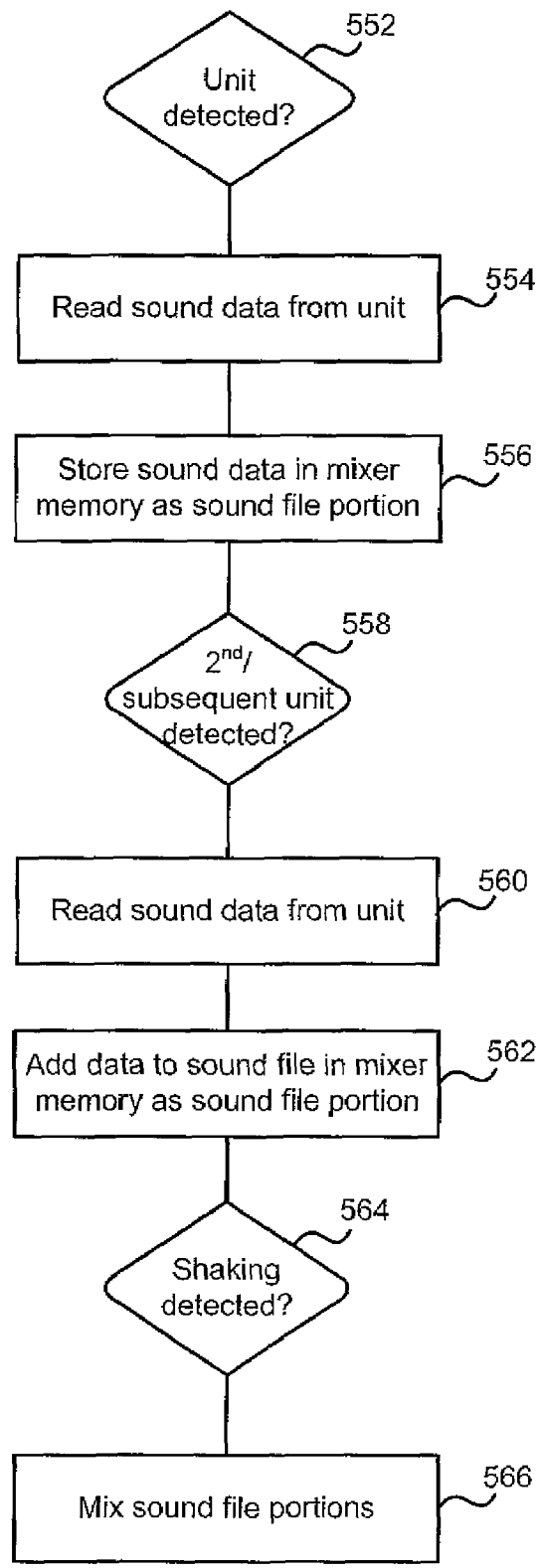
FIG. 7 shows a method of editing sound using the device of FIG. 5.

In use, sound stored on units 104 can be edited as now described with reference to the flow chart of FIG. 7 (whatever the position of the edit/store switch 116). A unit 104 can be fed through the slot 408 (block 552) and any sound data stored in its memory 204 is read (block 554), is transmitted via the transmitter/receiver 208 to the receiver 502 of the mixer 400, and then stored in the memory 506 of the mixer (block 556). If a second unit 104 is then fed through the slot 404 (block 558), its recorded sound is also read (block 560) and stored in the mixer's memory 506 (block 562). As a default, these stored sounds are stored separately from one another but are linked together, one after another, and will be played back through the speaker 510 in the order in which the units 104 were placed in the box 402 on activation of the play button 406.

However, the user can further edit the sound by shaking the mixer 400 (block 564). This action, which is detected by the motion detector 508, results in the sound files being mixed together by the microprocessor 504 (block 566). In this embodiment, the longer the mixer 400 is shaken, the more the recorded sound data is mixed. Equally, shaking the box 400 vigorously results in a more jumbled result than shaking gently. In this embodiment, the microprocessor 504 is arranged to determine the volume levels of the sound files stored on the units 104 and to balance the sound levels across the files on mixing them. The microprocessor 504 repeatedly takes portions of the sound files and rearranges them randomly for as long as the mixer 400 is shaken.

Figure 8:
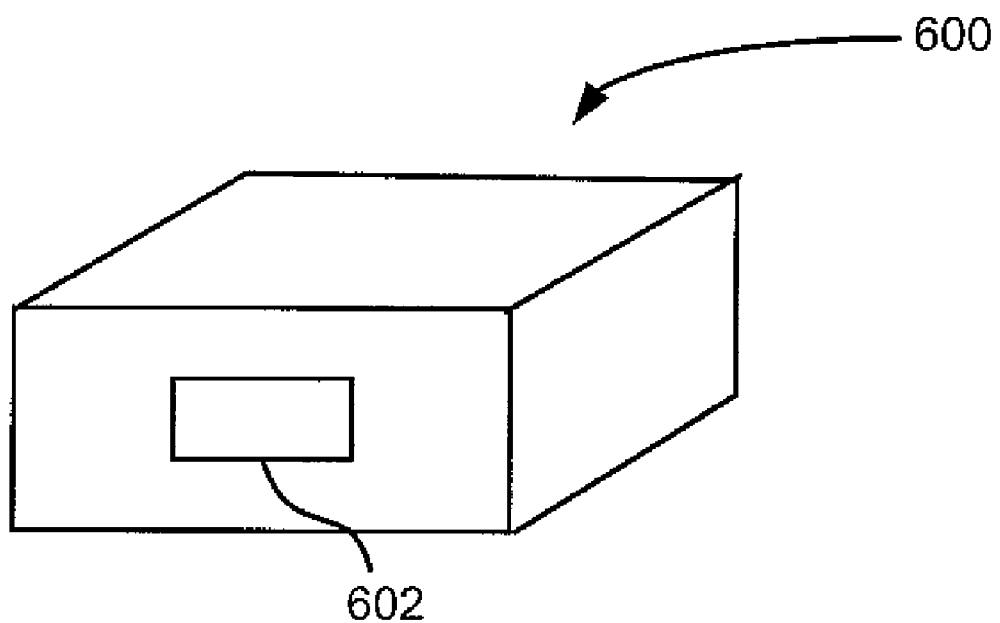
FIG. 8 is a representation of an object with a machine readable identity which can be associated with a remotely stored sound file.

Although the above embodiment has been described in terms of a sound recording unit as shown in FIG. 1, it will be appreciated that other sound recording devices may be used. For example, sound recording units such as digital dictation or memo devices could be used. Alternatively, the mixer 400 may be used with 'audio-paper' tape, using digital paper bearing a representation of sound or a barcode. In such embodiments, the receiver module 502 of the mixer 400 may be replaced with an optical scanning device capable of reading the digital paper or bar code. Indeed, the receiver/scanning device may not be arranged to receive or read data representing the stored sound directly, but instead be capable of identifying the unit 104 or other recording medium or indeed a separate object with an identity associated with a sound file (for example, a block containing an RFID tag from another source (e.g. the Internet or a local mass storage device) using that identity. An example of such an object 600 with an RFID tag 602 is shown in FIG. 8.

In some embodiments, there may be more than one type of sound recording apparatus provided. For example, the units 104 described herein may be arranged to cooperate with a sound recording storage device. The arrangement could be such that tapping one of the units 104 onto this sound recording storage device could transfer the sound files from the unit 104 to the sound recording storage device. Shaking the sound recording storage device could result in the content of the stored sound files being re-ordered (scrambled).

In another embodiment, a unit 104 may comprise at least two dividable sections each of which comprises a memory capable of holding a sound file. In such an embodiment, dividing the sections may cause any sound files stored thereon to be divided among the sections.

The various editing processes described above are instinctive to a user as the physical action taken by the user mirrors the result of the editing process. That is to say, feeding the units 104 or other recording media into the sound mixer 400 one after another results in the sound files stored thereon being associated such that they may be played back one after another in the order in which they are fed into the mixer 400. 'Mixing' the units 104 or other media in the sound mixer 400 by shaking it results in the sound stored on the individual media becoming intermingled, i.e. mixed, and the more the mixer 400 is shaken to mix the media, the more the sound is intermingled. A similar statement applies to shaking units 104 together. Shaking a single unit 104 results in a sound file stored thereon becoming re-ordered or scrambled (in other embodiments, shaking a single unit may result in a reverberation effect). Knocking units 104 together mirrors the result of the editing in that the stored sound is 'knocked' from one unit 104 to another. Turning the units 104 in space turns the volume up or down.

CONCLUSION

The term 'microprocessor' is used herein to refer to any device with processing capability such that it can execute instructions. Those skilled in the art will realize that such processing capabilities are incorporated into many different devices and therefore the hardware such as PCs, servers, mobile telephones, personal digital assistants and many other devices could be modified to carry out the methods described herein.

The methods described herein may be performed by software in machine readable form on a tangible storage medium. The software can be suitable for execution on a parallel processor or a serial processor such that the method steps may be carried out in any suitable order, or simultaneously.

This acknowledges that software can be a valuable, separately tradable commodity. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

Those skilled in the art will realize that storage devices utilized to store program instructions on data files can be distributed across a network. For example, a remote computer may store an example of the process described herein. A local or terminal computer may access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a DSP, programmable logic array, or the like.

Any range or device value given herein may be extended or altered without losing the effect sought, as will be apparent to the skilled person. In addition, the disclosure is not limited shape or form of the embodiments shown in the figures. While the unit 104 has been described a 'pebble-shaped', it need not be. In addition, the shape and configuration of the displayed elements, such as the position and of the buttons and the speaker, are not limiting. The bowl 300 may be any shape and the identifying means need not be arranged about the rim of the bowl. The mixer 400 is shown as cuboid but may be any shape. Equally, the slot 408 may be in a different location or of a different shape.

It will be understood that the benefits and advantages described above may relate to one embodiment or may relate to several embodiments. It will further be understood that reference to 'an' item refers to one or more of those items.

The steps of the methods described herein may be carried out in any suitable order, or simultaneously where appropriate. Aspects of any of the examples described above may be combined with aspects of any of the other examples described to form further examples without losing the effect sought.

It will be understood that the above description of a preferred embodiment is given by way of example only and that various modifications may be made by those skilled in the art. The above specification and examples provide a complete description of the structure and use of exemplary embodiments of the invention. Although various embodiments of the invention have been described above with a certain degree of particularity, or with reference to one or more individual embodiments, those skilled in the art could make numerous alterations to the disclosed embodiments without departing from the spirit or scope of this invention.

The invention claimed is:

1. A sound editing apparatus arranged to process at least one sound file comprising processing circuitry and a motion detection device, wherein the motion detection device is arranged to detect when a user physically interacts with the editing apparatus and the processing circuitry is arranged to scramble the content of an original sound file by dividing the original sound file into a plurality file segments and re-ordering the file segments, such that, on playback, the file segments are played out of the order in which the sound segments were recorded in the original sound file.

2. The sound editing apparatus of claim 1 which comprises at least one tangible representation of a sound file.

3. The sound editing apparatus of claim 2 in which the tangible representation(s) of sound files comprise recording media on which the sound files are stored.

4. The sound editing apparatus of claim 3 in which the recording media is a digital recorder.

5. The sound editing apparatus of claim 2 in which the tangible representation(s) of sound files comprise an object with an identity which is associated with a sound file.

6. The sound editing apparatus of claim 1 in which the motion detection device of the first sound editing apparatus is arranged to determine when a second sound editing apparatus is brought into contact with the first sound editing apparatus and the processing circuitry of the first sound editing apparatus is arranged to receive a sound file from the second sound editing apparatus and join a selected sound file from the first sound editing apparatus with the sound file received from the second sound editing apparatus on such determination.

7. The sound editing apparatus of claim 1 which is arranged to determine when a second sound editing apparatus is shaken together with the first sound editing apparatus and the processing circuitry of the first sound editing apparatus is arranged to receive a sound file from the second sound editing apparatus and mix the content of the sound file received from the second sound editing device with a selected sound file from the first sound editing device on such determination.

8. The sound editing apparatus of claim 1 in which the motion detector is arranged to detect when the sound editing apparatus is turned about an axis and the processing circuitry is arranged to alter the volume of the sound file upon such determination.

9. The sound editing apparatus of claim 1 which comprises a remotely readable identity.

10. Apparatus comprising a memory arranged to hold a sound file, the apparatus having a motion detector arranged to characterize the motion to which the apparatus is subjected and a processor arranged to process a sound file held in the memory according to the characterization of the motion, wherein the motion is an angular rotation about an axis and wherein in response to the angular rotation about an axis the processor is arranged to process the sound file by adjusting the output volume of the sound file.

11. The apparatus of claim 10 which comprises a transmitter arranged to transmit a sound file.

12. The apparatus of claim 10 which comprises a receiver arranged to receive information.

13. The apparatus of claim 10 which comprises a proximity sensor arranged to detect when another sound recording apparatus is in close proximity.

14. The sound editing apparatus of claim 6, wherein the beginning of the sound file from the second sound editing apparatus is appended to the end of the selected sound file from the first sound editing apparatus.

15. A method of editing sound recordings comprising:
providing first and second sound editing devices;
determining that the first sound editing device is being shaken alone;
in response to determining that the first sound editing device is being shaken alone, scrambling the content of a selected sound file on the first sound editing device by dividing the selected sound file into a plurality file segments and re-ordering the file segments, such that, on playback, the file segments are played out of the order in which the sound segments were recorded in the selected sound file;
determining when the second sound editing device is being shaken with the first sound editing device;
in response to determining that the second sound editing device is being shaken with the first sound editing device, requesting a sound file from the second sound editing device; and
in response to receiving the sound file from the second sound editing device, mixing the sound file received from the second sound editing device with the selected sound file on the first sound editing device.

16. A method of editing sound recordings according to claim 15 which further comprises:
determining that the second sound editing device has contacted the first sound editing apparatus;
in response to determining that the second sound editing device has contacted the first sound editing device, requesting a sound file from the second sound editing device; and
in response to receiving the sound file from the second sound editing device, joining the beginning of the sound file from the second sound editing device to the end of a selected sound file on the first sound editing device, whereby the joined files form a single sound file.

17. A method of editing sound recordings according to claim 15 in which a degree to which the sound files are mixed is related to a degree to which the first and second sound editing devices are shaken.

18. A method of editing sound recordings according to claim 15 which comprises identifying tangible representation(s) of sound files and retrieving the sound files associated therewith.

* * * * *